(12) United States Patent
Pan et al.

(10) Patent No.: US 6,748,248 B1
(45) Date of Patent: Jun. 8, 2004

(54) EXTENDED INPUT DEVICE FOR PORTABLE WIRELESS COMMUNICATION APPARATUS

(75) Inventors: Jung-Chuan Pan, Sanchung (TW); Jay Terng, Taipei (TW)

(73) Assignee: Silitek Corporation, Taipei (TW)

( * ) Notice: Subject to any disclaimer, the term of this patent is extended or adjusted under 35 U.S.C. 154(b) by 478 days.

(21) Appl. No.: 09/692,792

(22) Filed: Oct. 20, 2000

(51) Int. Cl.⁷ ................................................ H04M 1/00
(52) U.S. Cl. ..................... 455/575.1; 361/814
(58) Field of Search ..................... 455/575.1–575.4, 455/556.1, 556.2, 66.1; D14/137, 138; 361/679–680, 814

(56) References Cited

U.S. PATENT DOCUMENTS 5,661,641 A * 8/1997 Shindo ........................ 361/814

2002/0006815 A1 * 1/2002 Finke-Anlauff ............. 455/575

* cited by examiner

*Primary Examiner*—Lee Nguyen
(74) *Attorney, Agent, or Firm*—Knobbe Martens Olson & Bear LLP (57) ABSTRACT

An extended input device for a portable wireless communication apparatus includes a first input keypad, a second input keypad, a pivot portion connecting the first input keypad and the second input keypad, and pivotally switching the first input keypad and the second input keypad between a normal and an operating statuses, and a signal transmission portion connected to the first input keypad and the second input keypad for transmitting a signal between the extended input device and the portable wireless communication apparatus. Therefore, the extended input device can provide an enough area for typing and a small size for being easily packed up to be carried on.

2 Claims, 7 Drawing Sheets

EXTENDED INPUT DEVICE FOR PORTABLE WIRELESS COMMUNICATION APPARATUS

FIELD OF THE INVENTION

The present invention relates to an extended input device, and more specially one for the portable wireless communication apparatus.

BACKGROUND OF THE INVENTION

Owing to the evolutions of software and hardware, additional functions of the mobile phone system have been gradually directed toward to the wireless transmission of the information. Therefore, it will be very common to use the mobile phone for receiving or sending e-mails, browsing web sites, doing internet-shopping, dealing with personal finance. Since the sale situation of the mobile phone with the WAP (wireless application protocol) function is so hot, the future of the mobile phone can be expected. As the demand of inputting the data into the mobile phone increases, the traditional keys of the present mobile phone cannot meet such demand for inputting function. Therefore, it is necessary to provide an extended keyboard for the user to quickly type therethrough alphabet characters or instructions into the mobile phone.

Figure 1:
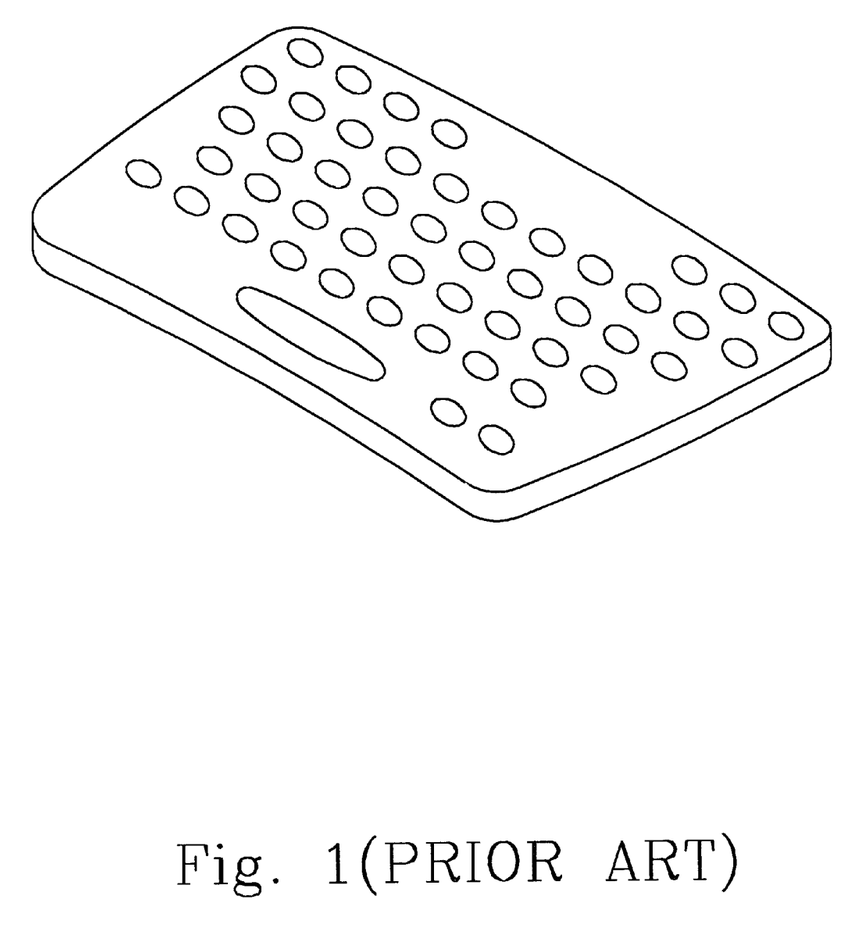
FIG. 1 is the appearance diagram of the extended keyboard according to the prior art.

FIG. 1 shows the appearance diagram of the extended keyboard according to the prior art. As shown in FIG. 1, as the mobile phone is getting smaller and smaller, the size of the traditional extended keyboard is too big to be carried conveniently because it has to provide the enough input area for typing. Thus, it seriously affects the buying and using will of the consumer. Therefore, it is worthwhile for researching how to solve the defects in the traditional device for further providing an extended input device which is convenient in use and easy in packing up the portable wireless communication apparatus such as the mobile phone.

It is therefore tried by the applicant to deal with the above situation encountered in the prior art.

SUMMARY OF THE INVENTION

It is therefore an object of the present invention to propose an extended input device having an enough area for inputting retrieving information easily.

It is therefore another object of the present invention to propose an extended input device having a small size for be packed up to be carried on conveniently.

According to the present invention, an extended input device for a portable wireless communication apparatus comprises a first input keypad, a second input keypad, a pivot portion connecting the first input keypad and the second input keypad, and pivotally switching the first input keypad and the second input keypad between a normal and an operating statuses, and a signal transmission portion electrically connected to the first input keypad and the second input keypad for transmitting a signal between the extended input device and the portable wireless communication apparatus.

Certainly, the extended input device can further comprise a clipping portion for clipping the first input keypad and the second input keypad on the portable wireless communication apparatus. The clipping portion is connected to the back of said first input keypad and pivots about a shaft.

Certainly, the clipping portion can comprise a first movable protruding portion located on the back of the first input keypad, and placed in a groove of the back of the first input keypad under a normal status (non-operating status) and protruding on the back of the first input keypad under an operating status for clipping the portable wireless communication apparatus, and a second movable protruding portion located on the back of the second input keypad, and placed in a groove of the back of the second input keypad, under a normal status and protruding on the back of the second input keypad under an operating status for clipping the portable wireless communication apparatus.

Certainly, the signal transmission portion can be a signal connecting line.

According to another aspect of the present invention, an extended input device for a portable wireless communication apparatus comprises a first input keypad, a second input keypad, a pivot portion connecting the first input keypad and the second input keypad, and pivotally switching the first input keypad and the second input keypad between a normal and an operating statuses, and a signal transmission portion connected to the first input keypad and the second input keypad for transmitting a signal between the extended input device and the portable wireless communication apparatus.

Preferably, the signal transmission portion is an infrared ray signal transmission module.

According to additional aspect of the present invention, an extended input device for a portable wireless communication apparatus comprises a first input keypad, a second input keypad, a switching device allowing the first input keypad and the second input keypad to form a flat surface under an operating status, and to form a collapsed condition under a normal status, and a signal transmission portion connected to the first input keypad and the second input keypad for transmitting a signal between the extended input device and said portable wireless communication apparatus.

Certainly, the switching device can include a hollow portion provided in the first input keypad for receiving therein the second input keypad under the normal status, the second input keypad being pulled out of the first input keypad under the operating status.

The present invention may best be understand through the following description with reference to the accompanying drawings, in which:

DETAILED DESCRIPTION OF THE PREFERRED EMBODIMENT

Figure 2A:
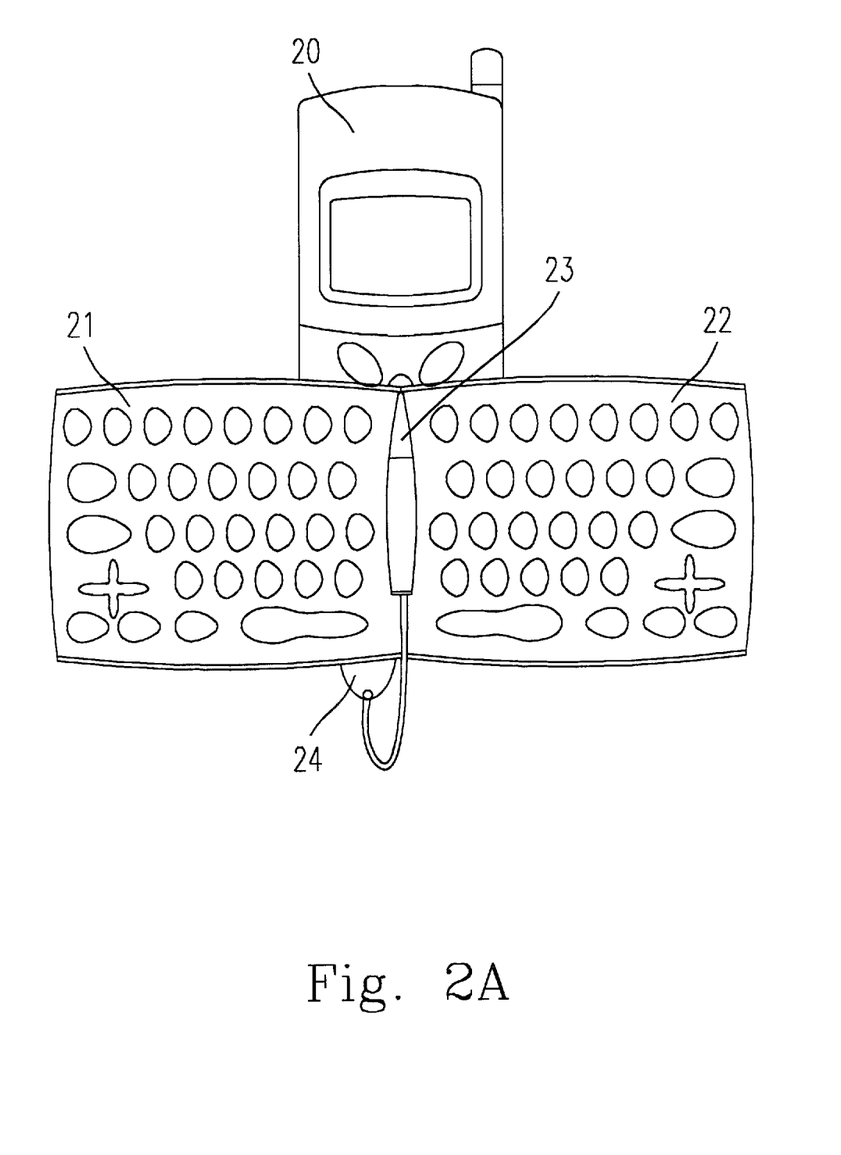
FIGS. 2A–2C are the diagrams of the structure of an extended input device connectible to a portable wireless communication apparatus according to a preferred embodiment of the present invention.

FIG. 2A is the diagram of the structure of an extended input device connectible to a portable wireless communication apparatus 20 (there is shown a mobile phone in FIG. 2A) according to a preferred embodiment of the present invention. The first input keypad 21 and the second input keypad 22 (where the keypads in FIG. 2A are parts of the keyboard, but it also can be the touch pad, track ball, or the writing input pad, etc . . . ) are connected to each other by the pivoting portion 23. As shown in FIG. 2A, the pivoting portion 23 can keep in an unfolded form of the first input keypad and the second input keypad under an operating status, which is easy to do the inputting action for users. The signal transmission portion, being a signal connecting line 24 in FIG. 2A, is connected to the first input keypad 21 and the second input keypad 22 for achieving the signal transmission between the extended input device and the portable wireless communication apparatus 20.

Figure 2B:
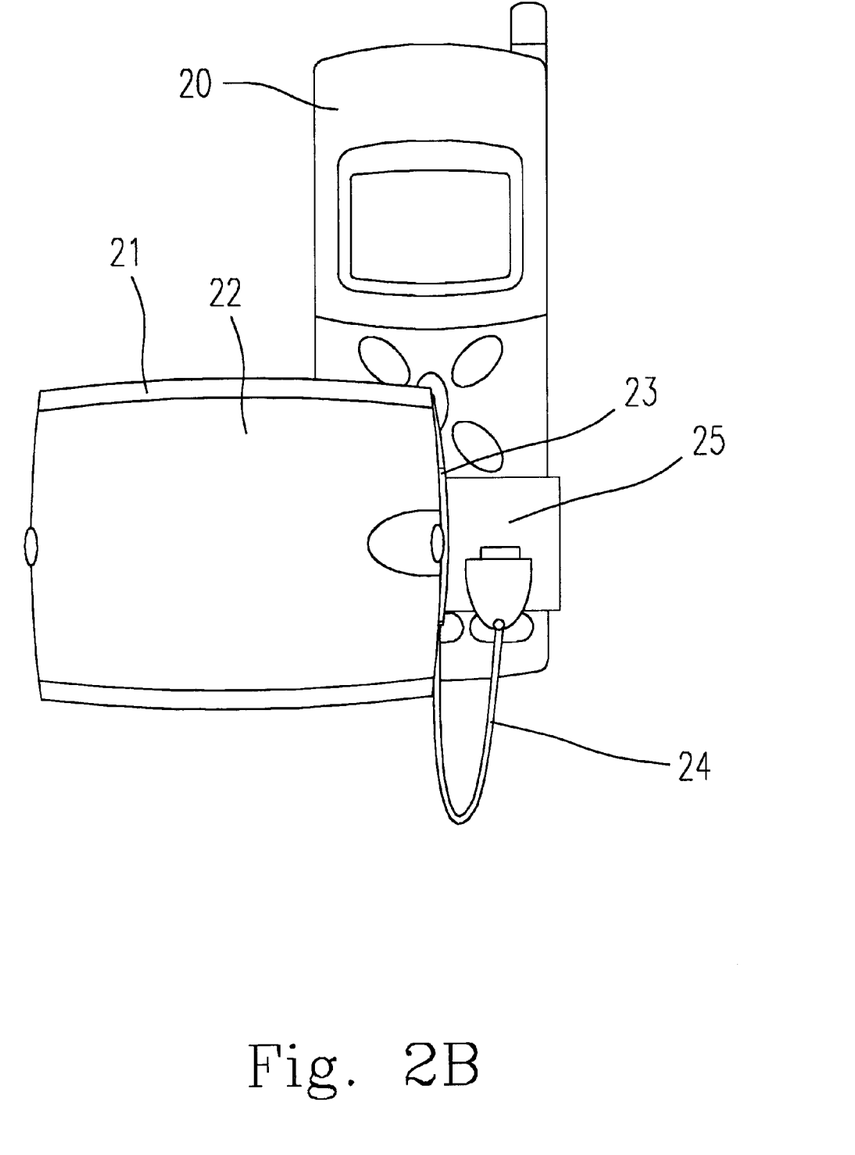

As shown in FIG. 2B, the extended input device is clipped to the portable wireless communication apparatus 20 by the clipping portion 25 which is located on the back of the input keypad and can be pivoted about a shaft. Through the switching of the pivoting portion 23, the folded form of the first input keypad 21 and the second input keypad 22 shows the normal status (non-operating status). Thus, the folded form is convenient for packing up the extended input device by the user. Under this normal status, the signal transmission portion, being a signal connecting line 24 in FIG. 2B (where the signal transmission can also be performed by the infrared ray signal transmission module) is able to disconnect the extended input device from the portable wireless communication apparatus 20.

Figure 2C:
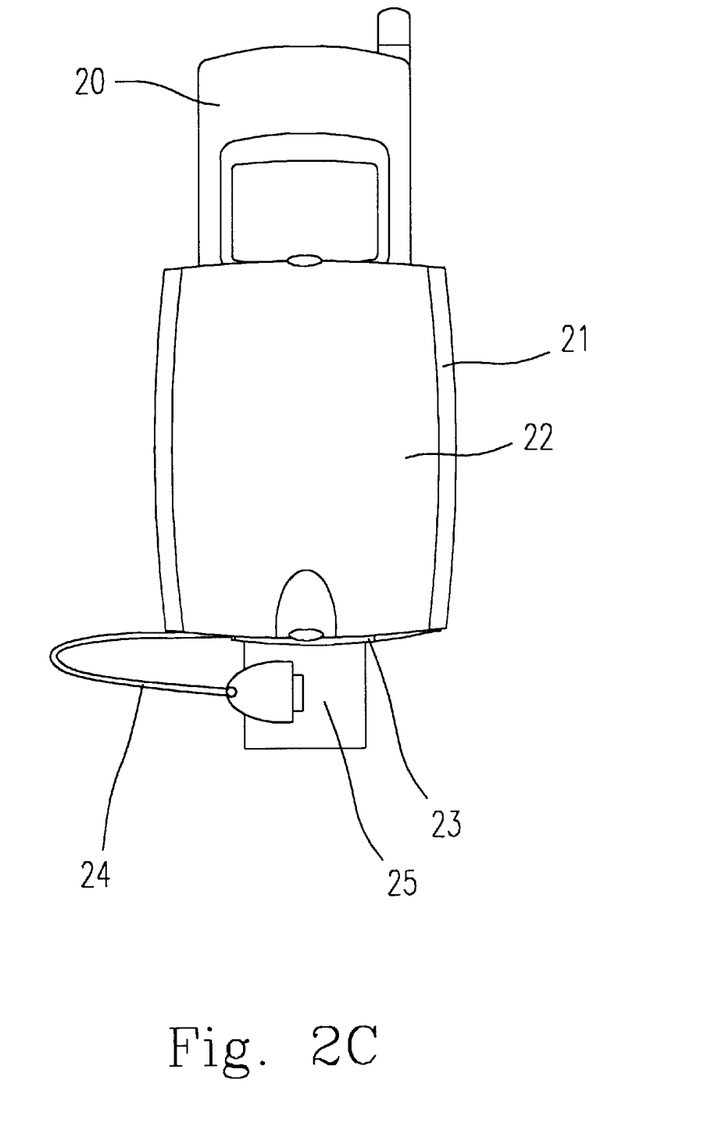

Owing to the fact that the clipping portion 25 is located on the back of the first input keypad 21 and can be pivoted about the shaft, the folded form of the first input keypad and the second input keypad can be pivoted to form a shape as shown in FIG. 2C. It is more convenient to be packed up and carried on by the user. Certainly, the whole extended input device can be optionally disconnected and removed from the portable wireless communication apparatus 20. Therefore, it is further easy to be packed up.

Figure 3A:
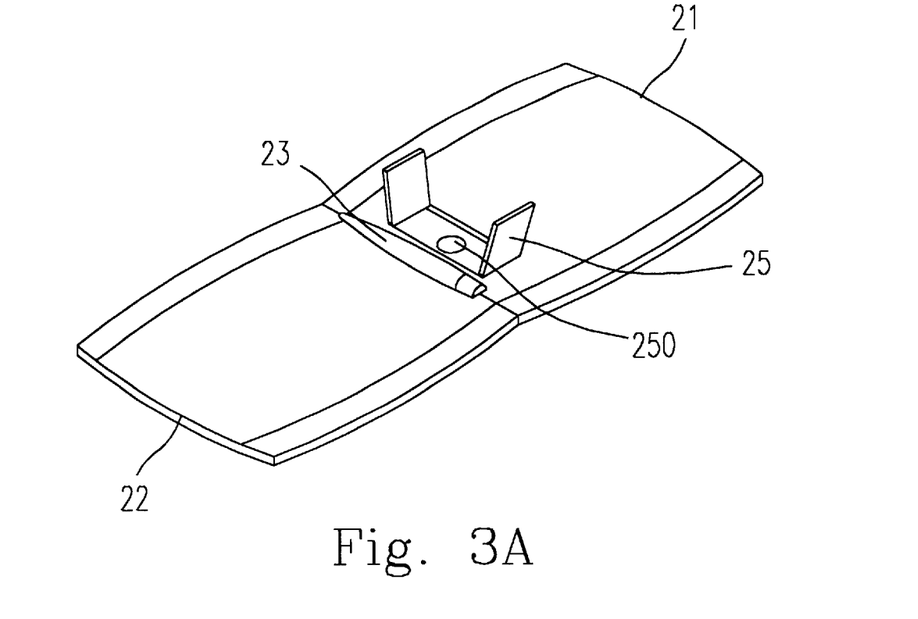
FIGS. 3A–3C are diagrams of the structure of the clipping portion located on the back of the extended input device according to first, second, and third embodiments of the present invention.

FIG. 3A shows the first embodiment of the clipping portion 25 located on the back of the extended input device. The clipping portion 25 is connected to the back of the first input keypad and can be pivoted about the shaft 250 to become the condition shown in FIG. 2C.

Figure 3B:
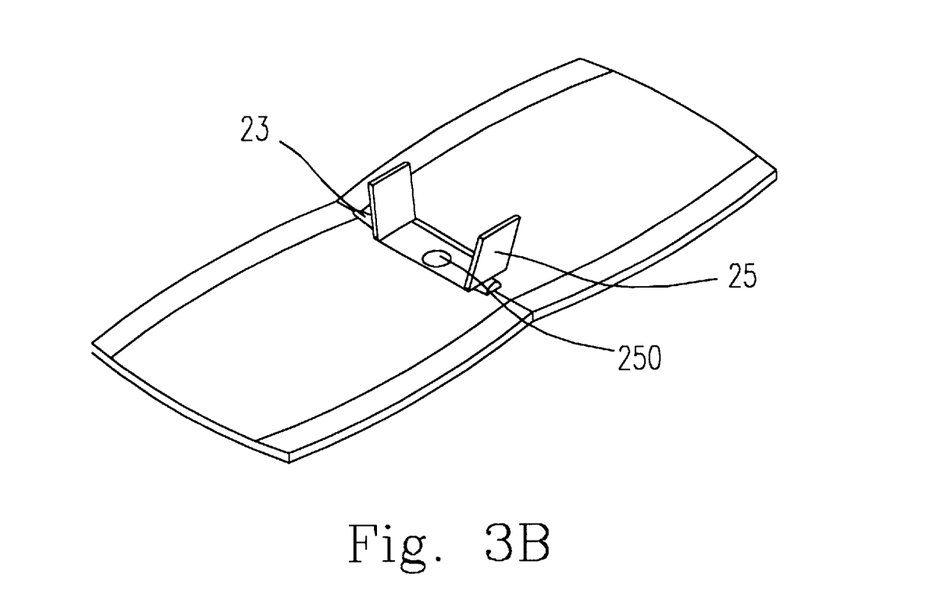

FIG. 3B shows the second embodiment of the clipping portion 25 located on the back of the extended input device. The clipping portion 25 is connected to the back of the pivoting portion 23 and can be pivoted about shaft 250 to further become the condition shown in FIG. 2C.

Figure 3C:
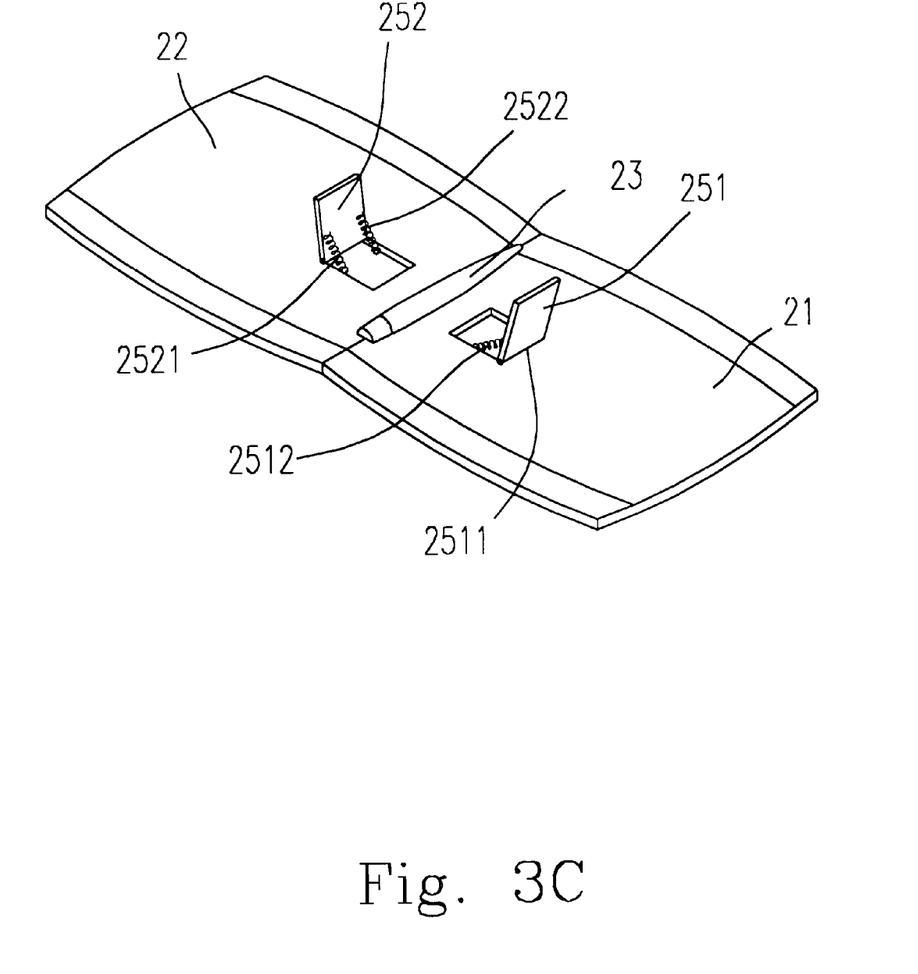

FIG. 3C shows the third embodiment of the clipping portion 25 located on the back of the extended input device. The clipping portion 25 includes the first movable protruding portion 251 and the second movable protruding portion 252 which are located on the backs of the first input keypad 21 and the second input keypad 22, respectively. Under the normal status (non-operating states), the first movable protruding portion 251 and the second movable protruding portion 252 are respectively received in the grooves of the first input keypad 21 and the second input keypad 22. After applied with an external force, the movable protruding portions 251, 252 will be respectively pivoted about the shaft 2511 and the shaft 2521 to protrude beyond the backs of the input keypads 21, 22 for being clipped to the portable wireless communication apparatus 20 and to become the operating status. The springs 2512 and 2522 provide the clipping force of the protruding portions 251, 252 for clipping thereto the portable wireless communication apparatus 20, and the restoring force for returning protruding portions 251, 252 to the normal status.

Figure 4:
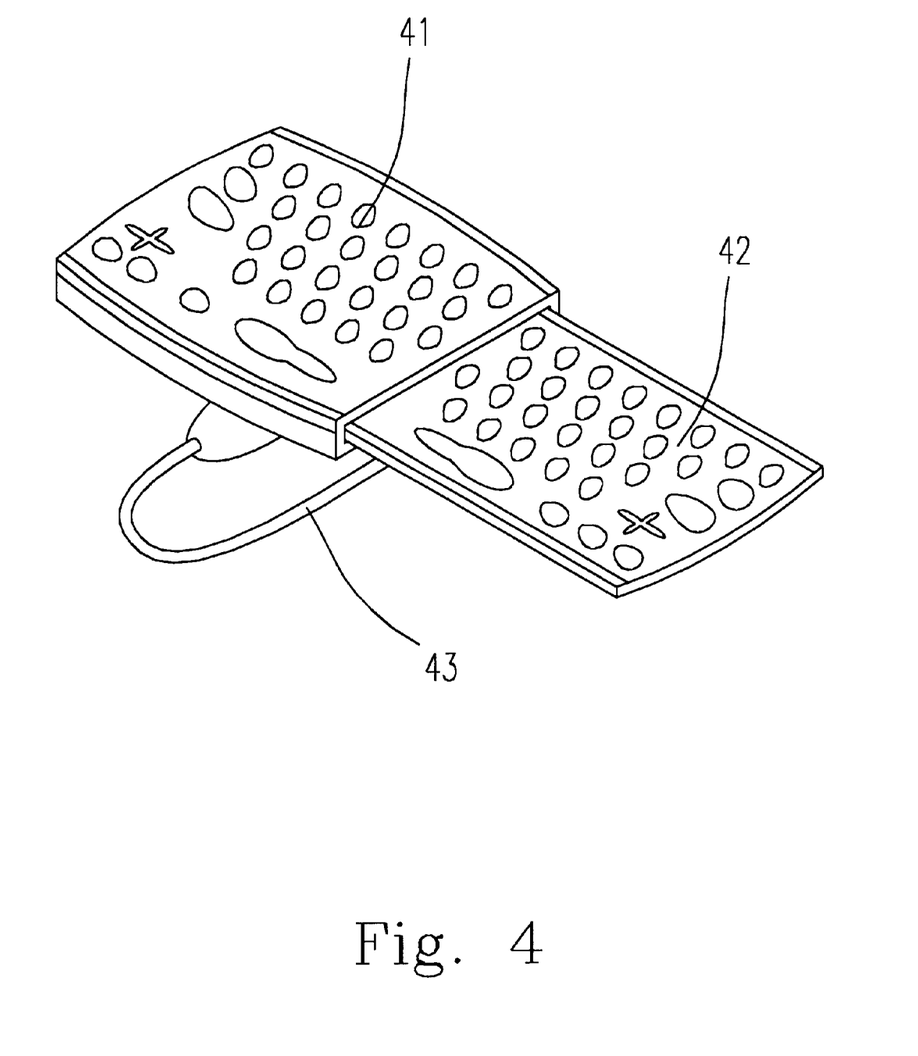
FIG. 4 is the diagram of the structure of an extended input device including an extended input keypad having a hollow portion for receiving therein the other one of the extended input keypads.

In addition, the extended input device can be implemented as shown in FIG. 4. The extended input device has a switching device including a hollow portion provided in the first input keypad 41 for receiving therein the second input keypad 42 under the normal status (non-operating status). Under the operating status, the second input keypad 42 can be pulled out of the first input keypad 41.

In sum, the embodiments of present invention disclose the extended input device to be applied to the portable wireless communication apparatus. The input keypad has the folding function. In addition, the clipping portion of the extended input device is able to achieve the fixation function for fixing itself to the portable wireless communication apparatus. Therefore, the present invention indeed provides an extended input device, which can be is conveniently used and easily packed up and carried on, for the portable wireless communication apparatus.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An extended input device for a portable wireless communication apparatus, comprising:

a first input keypad;

a second input keypad;

a pivot portion connecting said first input keypad and said second input keypad, and pivotally switching said first input keypad and said second input keypad between a normal and an operating statuses;

a signal transmission portion electrically connected to said first input keypad and said second input keypad for transmitting a signal between said extended input device and said portable wireless communication apparatus; and a clipping portion for clipping said first input keypad and said second input keypad on said portable wireless communication apparatus, wherein said clipping portion is connected to a back of said first input keypad and pivots about a shaft.

2. An extended input device for a portable wireless communication apparatus, comprising:

a first input keypad;

a second input keypad;

a pivot portion connecting said first input keypad and said second input keypad, and pivotally switching said first input keypad and said second input keypad between a normal and an operating statuses;

a signal transmission portion electrically connected to said first input keypad and said second input keypad for transmitting a signal between said extended input device and said portable wireless communication apparatus; and a clipping portion for clipping said first input keypad and said second input keypad on said portable wireless communication apparatus, wherein said clipping portion comprises:

a first movable protruding portion located on a back of said first input keypad, and placed in a groove of said back of said first input keypad under a normal status and protruding on said back of said first input keypad under an operating status for clipping said portable wireless communication apparatus; and a second movable protruding portion located on a back of said second input keypad, and placed in a groove of said back of said second input keypad under a normal status and protruding on said back of said second input keypad under an operating status for clipping said portable wireless communication apparatus.

* * * * *